Nov. 24, 1936.   J. L. SPENCE, JR   2,061,684
BACKLASH AND WEAR TAKE-UP FOR GEARS
Original Filed May 22, 1930
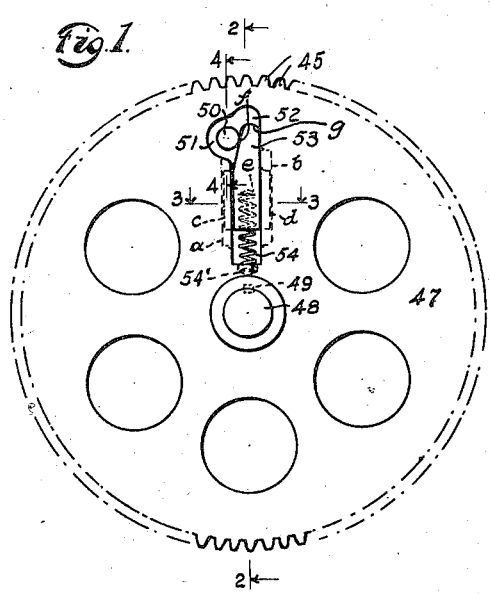
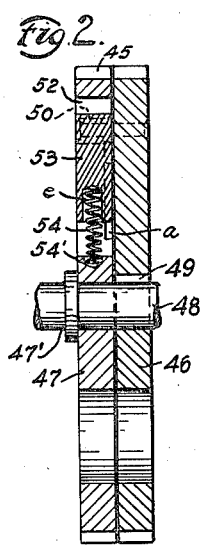
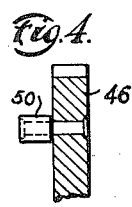
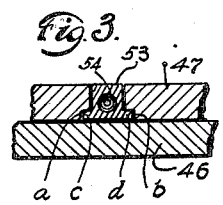
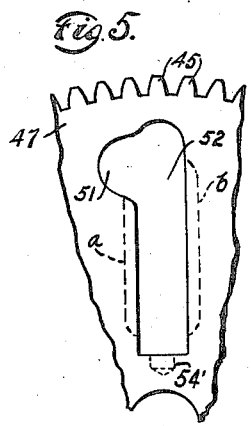
INVENTOR;
John L. Spence Jr.;
BY
Harold D. Penney, ATTORNEY.

UNITED STATES PATENT OFFICE 2,061,684

BACKLASH AND WEAR TAKE-UP FOR GEARS

John L. Spence, Jr., Brooklyn, N. Y.

Original application May 22, 1930, Serial No. 454,578. Divided and this application August 1, 1934, Serial No. 737,885

11 Claims. (Cl. 78—440)

The present invention relates to an improvement in gears, and has, for its principal object, the provision of means, in a gear or pinion, for eliminating back lash or lost motion in the driving or driven action thereof, and, further, to provide the gear with a constantly stressed take-up means for the adjusting for wear, the stress being exerted constantly in one direction.

This device is divided out of my co-pending United States patent application, maturing into Patent No. 1,977,154, dated October 16, 1934, and entitled Camera support.

The present invention is shown in conjunction with a double-disc or split gear, in which two spur-gears of like diameter on the pitch circles and like number of teeth and diametral pitch are connected face to face and are provided with means whereby they are relatively radially rotatable for a portion of an arc, less than the pitch of one tooth and such radial movement is constantly applied and tooth wear is continually being overcome, during operation of the gear.

The foregoing and other features will be noted as the herein description proceeds, and it is obvious that modifications may be made in the structure of the herein described device without departing from spirit thereof or the scope of the appended claims.

In the drawing,

Fig. 1 is an elevational side view of the gear;

Fig. 2 is a sectional view taken on line 2—2, Fig. 1, looking in the direction of the arrows;

Fig. 3 is a fragmentary sectional view taken on the line 3—3, Fig. 1, looking in the direction of the arrows;

Fig. 4 is a fragmentary view taken on the line 4—4, Fig. 1, looking in the direction of the arrow; and Fig. 5 is a fragmentary view of Fig. 1, showing the details of the wedge recess and gibway.

As in Fig. 2, the gear comprises two duplicate gears 46—47, both mounted in contact assembly on a shaft 48. One of the gears 46 is fixedly mounted to rotate with and on shaft 48 by means of the key 49. The other gear 47 is a free gear, that is, it is rotatable on shaft 48, and is held in its cooperative position adjacent gear 46 by a fixed flange 47' on shaft 48.

As in Fig. 5 the movable gear 47 is provided with a recess 52 cut clear through its thickness, such recess including, at its upper end as viewed in Fig. 5, a pin clearance or recess 51. At the bottom of the recess there is provided a blind bore 54' in which to seat one end of a coiled spring.

The fixed gear 46 has affixed to its contact face, a driving pin or dog 50, Figs. 1, 2 and 4, and when the gears are assembled, as in Fig. 2, for operative function, the pin 50 protrudes into the recess 51 of the movable gear, as shown dotted in Fig. 1. The recess 51 is larger than the diameter of the pin 50, so that pin 50 will have desired freedom of movement in its association with gear 47.

The gear 47 has two gibways, $a$ and $b$, cut on opposite sides of the recess 52, as in Fig. 3, to receive and slidably support therein the two opposed gibs $c$ and $d$ on a movable slide wedge 53, which is operatively mounted for sliding take-up movement in the recess 52, as in Fig. 1.

The wedge 53 has a blind bore $e$ therein, as in Fig. 1, whereby to seat one end of a coiled spring 54 therein, the other end of said coiled spring being seated in seat 54' as previously described.

The upper side of the wedge 53, as viewed in Fig. 1, is angled, as at $f$, with a round nose $g$ on its upper end.

When in operative assembly, as shown in Figs. 1 and 2, it is obvious that, the spring 54 in compression, exerts a radial pressure upon the wedge 53, outwardly. This pressure causes the wedge or angled face $f$ to press upon the side of pin 50, thus tending to cause the two gears to move in opposite rotative directions under the stress of spring 54, such stress being constantly exerted.

Thus when the gear herein is about to be meshed with a companion driving or driven gear, not shown, and the wedge 53 is pushed inward towards the axis of the gear, to release the stress, the gears mesh, and wedge 53 is then released. This causes the gear teeth on gears 46—47 to grip the teeth of the meshed gear firmly preventing back-lash between the meshed gears and as the teeth wear, the wedge 53 is automatically moved forward sufficiently to take up such tooth wear.

Due to the lack of play between the meshed gears the noise of running is greatly reduced.

From the foregoing, it will be noted that the desired action of the gears is accomplished by a sliding wedge which is under constant radial stress and which acts in a radial direction to care for back lash and wear.

It will also be noted that the wedge is irreversible, that is, no amount of pressure by pin 50 upon the wedge slide face $f$ will push the wedge 53 backwards, but the small spring 54 can easily move the wedge slide outwardly.

Having thus described the invention what is claimed is:

1. An anti-back lash and wear take up for a gear comprising in combination a pair of gears mounted in side contact with each other, one of said gears being provided with a radially located gib-way, said gib-way having one open side which is closed by the other contacting gear, a slide located in said gib-way, said slide having a wedge end, means for constantly stressing the slide radially outwardly and a pin fixed in the other said gear and projecting into said gib-way and engaging said wedge end.

2. An anti-back lash and wear take up for a gear comprising in combination with a pair of gears mounted in side contact with each other upon a shaft, one of said gears being fixed to said shaft, the other gear being mounted upon said shaft, one of said gears being provided with a radially located gib-way, said gib-way having one open side which is closed by the other contacting gear, a slide encompassed by said gears in said gib-way, a wedge end on said slide, means for resiliently constantly stressing the slide radially outwardly and a pin fixed upon the other said gear and projecting into said gib-way and engaging said wedge end to cause both gears to be stressed radially in opposite directions.

3. A gear comprising in combination a relatively movable disc including peripheral teeth and having therein a radial slot with one open face, a second disc having teeth aligned with the first teeth, said second disc having movable side contact with the first disc and closing the slot at said open face, a pin disposed in one end of said slot and carried by the second disc, a radially movable member disposed in the slot and having at one end an inclined face, said face engaging the pin, and spring means seated in the opposite end of said slot and engaging the opposite end of said member in urging relation.

4. A gear comprising in combination a toothed disc having therein a radial slot which is provided with lateral undercut extensions, a relatively movable mating disc having teeth associated with the first teeth, a pin disposed in one end of the slot and spaced from the wall thereof, said pin being rigid with the second mentioned disc, a wedge member slidably mounted in the slot and having offset gibs disposed in said extensions, said member having at its pointed end an inclined face which engages said pin in the space, and a spring urging the opposite end of said member, said spring being seated in the opposite end of said slot.

5. A gear comprising in combination a peripherally toothed disc having therein a radial slot, said disc having therein and communicating with the inner end of the slot a bored seat; a second disc having teeth coacting with the first teeth, a pin disposed in the outer end of said slot and spaced from the wall thereof, said pin being rigid with the second mentioned disc; a wedge member slidably mounted in said slot and having in its inner end a bored seat, said member having at its outer end an inclined face which engages said pin in the space, and a compressed coil spring having its opposite ends positioned in the bored seats.

6. A gear comprising in combination a pair of discs having coacting peripheral teeth, one of said discs having therein a radial slot which is expanded at its outer end, said slot having opposed undercut lateral expansions towards its inner end, said latter disc having therein and communicating with the inner end of the slot a bored seat; a pin disposed in the outer end expansion and having a space thereabout, said pin being fast on the other disc; a wedge slidably mounted in the slot, the inner end of the wedge having therein and axial with the bored seat another bored seat, said wedge having parallel gibs in said lateral expansions and the outer or pointed end of the wedge having one of its sides engaging said pin, and a compressed coil spring having its opposite ends disposed in the bored seats, whereby to constantly urge said side against the pin.

7. In combination, a gear including a toothed disc having a radial slot therein, a shaft whereon said disc is mounted for rotative movement, a second disc engaging one side of the first disc and being rigid with the shaft, said second disc having teeth normally aligned with the first teeth, a pin disposed in one end of said slot and having a space thereabout, said pin being fixed on the relatively rigid disc, a flange also rigid with said shaft and engaging the opposite side of the movable disc, a slidable member disposed in said slot and having an inclined portion extending into said space, and linearly expansible means having one end disposed in the inner end of said slot, the other end of said means being engaged in urging relation against the inner end of said member, said portion being engaged against said pin, whereby to constantly urge the respective teeth out of the alignment.

8. In combination, a shaft having an annular guide fixed thereto, a gear including a toothed disc and having thereon a projection, means attaching said disc to the shaft, said disc forming another guide, a second disc mounted for rotative movement on said shaft and having its opposite sides engaged by said guides, teeth carried by the movable disc and normally aligned with the first teeth, said movable disc having therein a recess and a bore or seat, integral parallel radial tracks arranged to connect with said recess and the bore, said projection having a space thereabout and being positioned in the recess, a radially movable member disposed between and cooperating with the tracks, said member having an inclined face at one of its ends, said face being engaged against said pin in the space, and expansible means seated in said bore and engaging the other end of said member, whereby to constantly urge the respective teeth out of the alignment.

9. A gear comprising in combination a toothed disc having thereon a pin, a relatively movable toothed disc having therein a radial slot in one end of which the pin is disposed so as to provide a space around the pin, said discs being in flatwise engagement and the respective teeth being normally aligned; a radially movable member disposed in said slot and having on its inner lateral sides opposed gibs, said movable disc having therein and associated with the slot a gibway for the gibs, said member having at one of its ends an inclined face which engages one side of said pin, the space on the opposite side of said pin being rather less than a tooth interval, and a compressed spring seated in the opposite end of said slot and engaging the opposite end of said member, so that said face may constantly urge said pin whereby to expand said teeth to compensate for wear thereof.

10. A gear comprising in combination a pair of flat discs having registering shaft openings, said discs being relatively fixed and movable and having normally aligned peripheral teeth the relatively movable disc having therein an opening which is provided with parallel radially disposed boundary faces, said faces providing parallel inner expansions adjoining the other disc, said latter disc having fast thereon and disposed in the outer end of the opening a pin, and means disposed in said opening and coacting with the pin whereby to constantly urge the respective teeth out of the alignment, said means including a slidable member, said member having parallel sides which coact with said faces, and the inner portions of said sides being expanded and disposed in the expansions of the opening.

11. A gear comprising a peripherally toothed disc having rigid therewith a pin, said disc being relatively fixed and having a flat side, a relatively movable disc having teeth normally aligned with the first teeth, said movable disc having therein an elongate radially disposed guide chamber, said flat side providing the inner boundary of the chamber, the latter having in one end thereof said pin, and a spring pressed member slidably disposed substantially in the other end of the chamber and having an inclined face engaging said pin, whereby to constantly urge the respective teeth out of the alignment.

JOHN L. SPENCE, Jr.